(12) United States Patent
Kaushal et al.

(10) Patent No.: US 10,228,678 B2
(45) Date of Patent: Mar. 12, 2019

(54) TOOL FAILURE ANALYSIS USING SPACE-DISTORTED SIMILARITY

(71) Applicant: Tokyo Electron Limited, Tokyo (JP)

(72) Inventors: Sanjeev Kaushal, San Jose, CA (US); Sukesh Janubhai Patel, Cupertino, CA (US); Wolfgang Polak, Sunnyvale, CA (US); Orion Wolfe, Oakland, CA (US)

(73) Assignee: TOKYO ELECTRON LIMITED, Tokyo (JP)

( * ) Notice: Subject to any disclaimer, the term of this patent is extended or adjusted under 35 U.S.C. 154(b) by 579 days.

(21) Appl. No.: 14/805,793

(22) Filed: Jul. 22, 2015

(65) Prior Publication Data

US 2017/0023927 A1     Jan. 26, 2017

(51) Int. Cl.
*G06F 19/00* (2018.01)
*G05B 19/4065* (2006.01)

(52) U.S. Cl.
CPC ........... *G05B 19/4065* (2013.01); *G05B 2219/37242* (2013.01); *G05B 2219/37245* (2013.01); *G05B 2219/45031* (2013.01)

(58) Field of Classification Search
CPC ...... G05B 19/4065; G05B 2219/37245; G05B 2219/37242; G05B 2219/45031
USPC .......................................... 700/110, 174, 175
See application file for complete search history.

(56) References Cited

U.S. PATENT DOCUMENTS

| | | | | |
|---|---|---|---|---|
| 4,806,914 A | * | 2/1989 | Thomas | G01H 1/16 340/680 |
| 5,663,894 A | * | 9/1997 | Seth | G05B 19/4063 702/56 |
| 6,580,960 B1 | * | 6/2003 | Nicholson | H01L 22/20 257/E21.525 |
| 6,604,013 B1 | * | 8/2003 | Hamidieh | G05B 19/4065 700/174 |
| 6,701,204 B1 | * | 3/2004 | Nicholson | H01L 22/20 257/E21.525 |
| 6,701,259 B2 | * | 3/2004 | Dor | H01L 22/20 257/E21.525 |
| 6,834,212 B1 | * | 12/2004 | Patel | G05B 13/048 700/117 |

(Continued)

OTHER PUBLICATIONS

Taiwanese Office Action dated May 1, 2017 for Taiwanese Application Serial No. 105123001, 21 pages (with English translation).

(Continued)

*Primary Examiner* — Viet Q Nguyen
(74) *Attorney, Agent, or Firm* — Amin, Turocy & Watson, LLP

(57) ABSTRACT

Systems and techniques to facilitate tool failure analysis associated with fabrication processes are presented. A monitoring component determines a candidate tool failure associated with one or more fabrication tools based on sensor data generated by a set of sensors associated with the one or more fabrication tools. A signature component generates a signature dataset for the candidate tool failure based on data associated with the one or more fabrication tools. A comparison component compares the candidate tool failure to at least one previously determined tool failure based on the signature dataset and at least one other signature dataset associated with the at least one previously determined tool failure.

22 Claims, 12 Drawing Sheets

(56) References Cited

U.S. PATENT DOCUMENTS

| | | | | |
|---|---|---|---|---|
| 6,885,977 B2* | 4/2005 | Gavra | ...................... | H01L 22/20 257/E21.525 |
| 6,900,385 B1* | 5/2005 | Hsu | ...................... | H02G 3/0462 174/36 |
| 6,952,653 B2* | 10/2005 | Toth | ................... | G01N 21/9501 382/149 |
| 6,999,164 B2* | 2/2006 | Hasan | ................ | G01N 21/9501 356/237.4 |
| 7,277,824 B1* | 10/2007 | Ryskoski | ......... | G05B 19/41875 700/110 |
| 7,451,009 B2* | 11/2008 | Grubb | .................... | G06Q 10/00 700/110 |
| 7,512,508 B2 | 3/2009 | Rajski et al. | | |
| 8,078,552 B2* | 12/2011 | Kaushal | ............. | G05B 13/0265 706/12 |
| 8,190,543 B2* | 5/2012 | Kaushal | ............. | G05B 13/0265 706/45 |
| 8,234,001 B2* | 7/2012 | Rice | ................... | G05B 23/0294 700/109 |
| 9,710,903 B2* | 7/2017 | Fouquet | ................ | G06T 7/0006 |
| 2002/0072162 A1* | 6/2002 | Dor | ......................... | H01L 22/20 438/200 |
| 2004/0122859 A1* | 6/2004 | Gavra | ...................... | H01L 22/20 |
| 2005/0065739 A1* | 3/2005 | Knoch | ................ | G01N 15/1456 702/30 |
| 2007/0100784 A1* | 5/2007 | Arthur | ...................... | G06F 8/36 |
| 2007/0156379 A1* | 7/2007 | Kulkarni | ............. | G06F 17/5045 703/14 |
| 2007/0294591 A1* | 12/2007 | Usynin | ..................... | G06F 1/30 714/45 |
| 2008/0297667 A1* | 12/2008 | Patel | ................... | H04N 9/3141 348/744 |
| 2009/0271675 A1* | 10/2009 | Dickson | ............... | G01R 31/311 714/732 |
| 2010/0138026 A1* | 6/2010 | Kaushal | ............. | G05B 13/0265 700/104 |
| 2010/0262858 A1* | 10/2010 | Chen | .................... | G06F 11/0709 714/2 |
| 2012/0185813 A1* | 7/2012 | Kaushal | ........... | G05B 19/41875 716/112 |
| 2012/0242667 A1* | 9/2012 | Kaushal | ............. | G05B 23/0237 345/440 |
| 2014/0115413 A1* | 4/2014 | Guo | ............... | G01R 31/318525 714/727 |
| 2014/0135970 A1* | 5/2014 | Kaushal | ........... | G05B 19/41875 700/121 |
| 2014/0163712 A1* | 6/2014 | Waterman | ......... | H01L 21/67288 700/108 |
| 2016/0302019 A1* | 10/2016 | Smith | ..................... | G01H 1/00 |

OTHER PUBLICATIONS

International Search Report and Written Opinion dated Sep. 29, 2016 for PCT Application Serial No. PCT/US16/42624, 15 pages.

* cited by examiner

TOOL FAILURE ANALYSIS USING SPACE-DISTORTED SIMILARITY

TECHNICAL FIELD

The described and claimed subject matter relates generally to tool failure analysis associated with fabrication processes.

BACKGROUND

Technological advances have lead to process-driven automated equipment that is increasingly complex. A tool system to accomplish a specific goal or perform a specific, highly technical process can commonly incorporate multiple functional elements to reach the goal or successfully execute the process, and various sensors that collect data to monitor the operation of the equipment. Such automated equipment can generate a large volume of data. Data can include information related to a product or a service performed as a part of the specific task and/or sizable log information related to the process. For example, process data and/or metrology data can be collected during a manufacturing process and/or stored in one or more datasets.

While modern electronic storage technologies can afford retaining constantly increasing quantities of data, utilization of the accumulated data remains far from optimal. Examination and interpretation of collected information generally requires human intervention. For example, a process on a semiconductor manufacturing tool may run for seventeen hours (e.g., 61,200 seconds). During processing, the semiconductor manufacturing tool may output sensor measurements every second via, for example, several hundred sensors. Accordingly, large datasets that include the output sensor measurements must then be manually studied (e.g., by process engineers) during process development and/or troubleshooting activities. However, it is difficult to determine emerging tool failures related to a tool system (e.g., based on the large datasets that include the output sensor measurements) using human intervention.

The above-described deficiencies of today's fabrication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a monitoring component, a signature component and comparison component. The monitoring component determines a candidate tool failure associated with one or more fabrication tools based on sensor data generated by a set of sensors associated with the one or more fabrication tools. The signature component generates a signature dataset for the candidate tool failure based on data associated with the one or more fabrication tools. The comparison component compares the candidate tool failure to at least one previously determined tool failure based on the signature dataset and at least one other signature dataset associated with the at least one previously determined tool failure.

In accordance with another implementation, a method provides for identifying a candidate tool failure associated with one or more manufacturing tools based on sensor data generated by a set of sensors associated with the one or more manufacturing tools, generating a signature dataset for the candidate tool failure based on the sensor data and other data associated with the one or more manufacturing tools, and comparing the signature dataset to at least one other signature dataset associated with at least one tool failure.

In accordance with yet another implementation, a computer-readable medium having stored thereon computer-executable instructions that, in response to execution by a system including a processor, cause the system to perform operations, the operations including determining a candidate tool failure associated with one or more fabrication tools, generating a signature dataset for the candidate tool failure based on data associated with the one or more manufacturing tools, and comparing the signature dataset to at least one other signature dataset associated with at least one previously determined tool failure.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
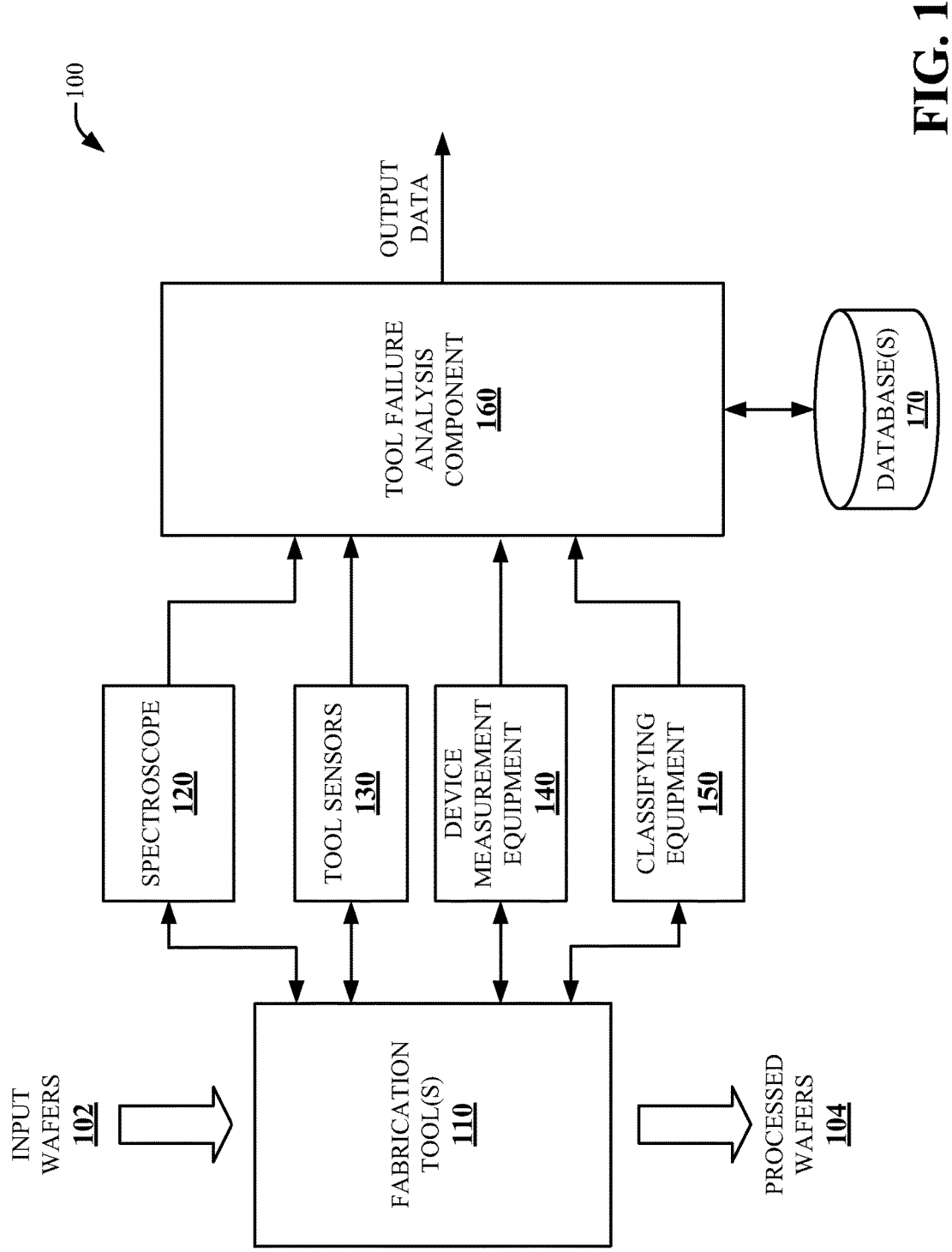
FIG. 1 is block diagram illustrating an exemplary system for facilitating tool failure analysis related to fabrication processes, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Technological advances have lead to process-driven automated equipment that is increasingly complex. A tool system to accomplish a specific goal or perform a specific, highly technical process can commonly incorporate multiple functional elements to reach the goal or successfully execute the process, and various sensors that collect data to monitor the operation of the equipment. Such automated equipment can generate a large volume of data. Data can include information related to a product or a service performed as a part of the specific task and/or sizable log information related to the process. For example, process data and/or metrology data can be collected during a manufacturing process and/or stored in one or more datasets.

While modern electronic storage technologies can afford retaining constantly increasing quantities of data, utilization of the accumulated data remains far from optimal. Examination and interpretation of collected information generally requires human intervention. For example, a process on a semiconductor manufacturing tool may run for seventeen hours (e.g., 61,200 seconds). During processing, the semiconductor manufacturing tool may output sensor measurements every second via, for example, several hundred sensors. Accordingly, large datasets that include the output sensor measurements must then be manually studied (e.g., by process engineers) during process development and/or troubleshooting activities. However, it is difficult to determine emerging tool failures related to a tool system (e.g., based on the large datasets that include the output sensor measurements) using human intervention.

To that end, techniques for analyzing process data (e.g., fabrication process data) to determine, predict and/or prevent tool failures related to fabrication processes are disclosed. A space-distorted measure of similarity characterized by a set of numeric and/or quantifiable attributes can be employed to determine (e.g., learn, recognize, predict, prevent, etc.) emerging tool failures (e.g., part failures). By employing a space-distorted measure of similarity, a variety of tool failures for a plurality of fabrication tools (e.g., semiconductor manufacturing tools) can be determined. Moreover, a space-distorted measure of similarity can be useful in applications where a definition of similarity in terms of attributes for tool failures is not a-priori known, but learned based on a limited amount of training data (e.g., when only a limited number of training examples exist).

In an aspect, each tool failure can be associated with an n-dimensional vector of attribute values implemented as a signature. For example, relevant statistics of different failures can be represented as a signature of information. A signature can be obtained by various statistical process control and/or other techniques that compute a difference between expected value(s) and observed value(s) associated with fabrication tool(s). In certain instances, a sequence of differences between expected values and observed value can be associated with a signature. Similar failures (e.g., the result of learning of similar failures) can be represented by a transformation of signatures in n-dimension space. Distance between two distinct tool failures can be determined by the distance of transformed signatures. In an example, distance of transformed signatures can be a distance in n-dimensional Euclidian space. Two failures can be considered similar if corresponding Euclidian distance is below a certain threshold value (e.g., is small) in the transformed space. A signature can be generated based on process data associated with at least one fabrication process (e.g., one or more fabrication tools). Additionally, training input (e.g., user input) can be employed to correct computed similarity and/or to modify a transformation function employed to determine similarity (e.g., by specifying that failures determined to be similar are dissimilar, by specifying that failures determined to be dissimilar are similar, by modifying a computed similarity based on observed failures, etc.). Based on process data and/or training input, accuracy of signatures can continuously improve over time.

Referring initially to FIG. 1, there is illustrated an example system 100 for analyzing process data to determine, predict and/or prevent tool failures related to fabrication processes (e.g., manufacturing processes, semiconductor production, semiconductor manufacturing tools, etc.), according to an aspect of the subject disclosure. System 100 can include fabrication tool(s) 110, spectroscope 120, tool sensors 130, device measurement equipment 140, classifying equipment 150, a tool failure analysis component 160 and/or database(s) 170. Fabrication tool(s) 110 can include one or more tools and/or one or more chambers for fabrication (e.g., manufacturing, etc.). In an aspect, fabrication tool(s) 110 can be associated with a semiconductor fabrication system. For example, as shown in FIG. 1, fabrication tool(s) 110 can receive input wafers 102 and output processed wafers 104. However, it is to be appreciated that fabrication tool(s) 110 can receive and/or generate a different type of asset (e.g., different units of processing). In an exemplary, non-limiting embodiment, fabrication tool(s) 110 can be an etch tool that removes unmasked material from input wafers 102 via an etching process (e.g., wet etch, dry etch, plasma etching, etc.) to generate processed wafers 104 having cavities and features formed thereon. Fabrication tool(s) 110 can also be a deposition tool (e.g., atomic layer deposition, chemical vapor deposition, etc.) that deposits material onto input wafers 102 to yield processed wafers 104. However, it is to be appreciated that fabrication tool(s) 110 can be associated with a different type of fabrication system.

A variety of measurement devices, such as spectroscope 120, tool sensors 130, device measurement equipment 140 and/or classifying equipment 150, can monitor one or more processes performed by fabrication tool(s) 110 to acquire disparate information relating to various aspects, conditions and/or results of the process. As an example, spectroscope 120 can acquire spectral data (e.g., spectral intensity information). Spectral data can include a set of intensities for respective wavelengths or spectral lines observable by spectroscope 120. Additionally, spectral data can include time-series data such that spectroscope 120 measures intensities for respective wavelengths at regular intervals (e.g., every second, every two seconds, every 100 milliseconds, etc.). Spectroscope 120 can also correlate spectral data with wafer IDs associated with specific wafers processed by fabrication tool(s) 110. Accordingly, spectroscope 120 can acquire spectral data individually for each wafer processed by fabrication tool(s) 110.

Tool sensors 130 can monitor and/or measure tool operation characteristics while fabrication tool(s) 110 processes input wafers 102. Furthermore, tool sensors 130 can generate corresponding sensor measurement data. Sensor measurement data, similar to spectral data measured by spectroscope 120, can be time-series data correlated on a per-wafer basis. Sensor measurement data can include measurements from a variety of sensors. Such measurements can include, but are not limited to, pressures within one or more chambers of fabrication tool(s) 110, gas flows for one or more distinct gases, temperatures, upper radio frequency (RF) power, elapsed time associated with a process (e.g., elapsed time since last wet-clean, etc.), and the like. In an aspect, sensor measurement data can be associated with physical quantities. In another aspect, sensor measurement data can be associated with virtual quantities.

Device measurement equipment 140 can generate device measurement data. For example, device measurement equipment 140 can measure physical and geometric properties of wafers and/or features fabricated on wafers. For instance, device measurement equipment 140 can measure development inspection critical dimension (DI-CD), final inspection critical dimension (FI-CD), etch bias, thickness, and so forth, at predetermined locations or regions of wafers. The measured properties can be aggregated on a per-location, per-wafer basis and output as device measurement information. Properties of wafers are typically measured before processing or after processing. Accordingly, device measurement data can be time-series data acquired at a different interval as compared with spectral data and sensor data.

Classifying equipment 150 can be implemented to acquire and/or generate data to classify fabrication tool(s) 110 and/or processed wafers 104. For example, the classifying equipment 150 can be implemented to acquire and/or generate maintenance data associated with fabrication tool(s) 110. Additionally or alternatively, the classifying equipment 150 can be implemented to acquire and/or generate classification data associated with processed wafers 104. Maintenance data can include, but is not limited to, elapsed time since a last preventative maintenance, age of one or more components associated with fabrication tool(s) 110 (e.g., age of tool parts, production time associated with a component, etc.), and the like.

Tool failure analysis component 160 can receive process data (and/or training data) acquired and/or generated by spectroscope 120, tool sensors 130, device measurement equipment 140 and/or classifying equipment 150. Tool failure analysis component 160 can receive the process data as the process data is generated (e.g., during an on-line mode). Additionally or alternatively, tool failure analysis component 160 can receive the process data upon completion of one or more processes associated with fabrication tool(s) 110. In an implementation, process data can be consolidated in a data matrix. For example, a data matrix can include wafer identification data, time data, sensor measurement data, spectral data and/or other data. A data matrix (e.g., a new data matrix) can be generated incrementally to initiate a new learning cycle.

In an aspect, tool failure analysis component 160 can normalize process data. For example, tool failure analysis component 160 can normalize process data to account for error associated with fabrication tool(s) 110. Tool failure analysis component 160 can normalize spectral data (e.g., measured intensities) to account for measurement error of intensity of spectral lines in different tools and/or chambers included in fabrication tool(s) 110. In a non-limiting example, tool failure analysis component 160 can compute a variable (e.g., total light intensity) associated with an arbitrarily selected reference chamber or reference tool included in fabrication tool(s) 110 to normalize process data.

In one or more embodiments, process data can be derived from tool process logs that record parameter data and/or performance data measured during respective runs of fabrication tool(s) 110. Tool process logs can include measurement data from spectroscope 120, tool sensors 130, device measurement equipment 140 and/or classifying equipment 150. Measurements recorded in such tool process logs can include, but are not limited to, sensor readings (e.g., pressures, temperatures, power, etc.), maintenance related readings (e.g., age of focus ring, age of mass flow controller, time since last performed maintenance, time since last batch of resist was loaded, etc.), and/or tool and performance statistics (e.g., time to process wafer, chemical consumption, gas consumption, etc.).

In an exemplary scenario, a tool process log can be generated by tool failure analysis component 160 at the end of each process run of fabrication tool(s) 110. At the end of a process run, data from one or more of the spectroscope 120, tool sensors 130, device measurement equipment 140, or classifying equipment 150 can be provided to tool failure analysis component 160, which can aggregate the collected data in a tool process log for the run. A tool process log can correspond to a single semiconductor wafer processed during the run, or a batch of semiconductors fabricated during the run. The tool process logs can then be stored for reporting or archival purposes. In an aspect, process data can be provided automatically by tool failure analysis component 160 or a related device. In another aspect, process data can be provided to tool failure analysis component 160 manually by an operator. Although the foregoing example describes process data as being retrieved or extracted from tool process logs, it is to be appreciated that process data may also be provided to tool failure analysis component 160 by other means. For example, in some embodiments, all or a subset of process data may be provided directly to tool failure analysis component 160 from devices 120, 130, 140 and/or 150.

The tool failure analysis component 160 can analyze process data associated with spectroscope 120, tool sensors 130, device measurement equipment 140 and/or classifying equipment 150 to determine (e.g., learn, recognize, predict, prevent, etc.) tool failure(s) associated with fabrication tool(s) 110. Additionally, the tool failure analysis component 160 can determine (e.g., learn, recognize, predict, prevent, etc.) tool failure(s) associated with fabrication tool(s) 110 based on data included in database(s) 170. A tool failure (e.g., a part failure, an artifact of interest, etc.) can be a tool failure associated with one or more fabrication processes and/or one or more fabrication tools (e.g., fabrication tool(s) 110). A tool failure can be associated with an unplanned interruption associated with fabrication tool(s) 110, a variance from set points and/or specifications associated with fabrication tool(s) 110, a hard tool failure, a soft tool failure, a calibration error, tool wear, tool breakdown, tool malfunction, tool downtime, another tool failure, etc. At least a portion of a fabrication tool 110 can be associated with a tool failure. Furthermore, one or more fabrication tool(s) 110 can be associated with a tool failure. The data included in the database(s) 170 can be associated with at least previously determined tool failure(s) related to the fabrication tool(s) 110.

The process data (e.g., the process data associated with spectroscope 120, tool sensors 130, device measurement equipment 140 and/or classifying equipment 150) can be compared to the data included in the database(s) 170 using the tool failure analysis component 160. Comparison of the process data and the data included in the database(s) 170 can facilitate determining (e.g., learning and/or recognizing) tool failure(s) associated with fabrication tool(s) 110. For example, a space-distorted measure of similarity between the process data (e.g., the process data associated with spectroscope 120, tool sensors 130, device measurement equipment 140 and/or classifying equipment 150) and the data included in the database(s) 170 can be determined by the tool failure analysis component 160. The tool failure analysis component 160 can further facilitate tool failure analysis, fault failure diagnosis and/or tool failure prevention to, for example, limit impact of tool failures and/or identify tool failures prior to an imminent tool failure.

In an aspect, the tool failure analysis component 160 can generate and/or employ signatures (e.g., signature datasets, signature vectors, etc.) that summarize process data for fabrication tool(s) 110. A signature (e.g., a signature dataset, a signature vector, etc.) can be associated with a tool failure (e.g., a candidate tool failure, a determined tool failure, a previously determined tool failure, etc.). For example, the tool failure analysis component 160 can determine a candidate tool failure associated with fabrication tools(s) 110. In response to determining the candidate tool failure, the tool failure analysis component 160 can additionally generate a signature for the candidate tool failure. The tool failure analysis component 160 can also store a signature for a candidate tool failure in the database(s) 170 in response to a determination that the candidate tool failure is a tool failure. Accordingly, a set of signatures associated with previously determined tool failure can be stored in the database(s) 170.

A signature can capture a state of a fabrication tool 110 (e.g., a state of a fabrication tool(s) 110 during a tool failure). For example, a signature can be an n-dimensional vector of attribute values associated with process data for a fabrication tool 110. A signature can be further associated with relevant statistics of different failures. A signature can include and/or be associated with one or more process logs, metrology measurements, part age, maintenance data, sensor data, other process data, etc. for the fabrication tool(s) 110. In one example, a signature of a tool failure can be a vector of sensor validations (e.g., an amount by which each sensor deviates from corresponding expected value) and/or other process data. Data associated with a signature can correspond to data captured and/or generated before a tool failure. Statistical process control and/or one or more other techniques can be employed by the tool failure analysis component 160 to generate a signature. Furthermore, the tool failure analysis component 160 can compute a difference based on expected value(s) of process data and observed value(s) of the process data to facilitate generation of a signature. For example, a signature can be a sequence of differences between expected values of process data and observed values of process data. In a non-limiting implementation, the tool failure analysis component 160 can monitor a semiconductor fabrication process (e.g., a semiconductor manufacturing process) associated with fabrication tool(s) 110 via at least a set of sensors (e.g., tool sensors 130). Sensor values can be validated, for example, by a statistical process control technique and/or one or more other validation techniques. Violations of expected sensor behavior detected by the validation can initiate generation of a signature for the semiconductor manufacturing process.

In certain implementations, the tool failure analysis component 160 can normalize components of a signature, for example, such that data values of a signature are between 0 and 1. The tool failure analysis component 160 can normalize data values of a signature via a transformation value. Accordingly, all data values of a signature (e.g., all attributes of a signature dataset) can have equal weight in an initial similarity calculation (e.g., a default similarity calculation) by normalizing data values of a signature (e.g., via a transformation value). Multiple normalized instances of a signature can comprise a single signature. In an example, a signature can be a concatenation of instance signatures for each processed wafer 104 in a lot. In another example, a signature can be a concatenation of instance signatures for each second of a certain timeframe (e.g., 30 seconds) prior to a tool failure (e.g., a heater failure) associated with fabrication tool(s) 110. In an aspect, the tool failure analysis component 160 can generate a signature in response to user input (e.g., during a training mode). For example, a tool failure and/or similarity between signatures (e.g., tool failures) can be identified by a user. The tool failure analysis component 160 can generate, in one example, a signature for a tool failure identified by a user.

The tool failure analysis component 160 can also receive training data (e.g., user input data) to facilitate a training mode. A training instance of a training mode can be associated with a first tool failure, a second tool failure, a first signature associated with the first tool failure, a second signature associated with the second tool failure, and similarity as determined by an external agent (e.g., user) or objective criteria (e.g., state of output generated by fabrication tool(s) 110 in the presence of specific tool failures). Therefore, training data (e.g., user input data) can be employed to improve and/or correct a comparison result (e.g., similarity) determined by the tool failure analysis component 160. In certain implementations, the tool failure analysis component 160 can employ separate training phases and querying phases. For example, the tool failure analysis component 160 can first be trained using a number of training instances. Then, in a separate phase, similarity can be queried using a learned transformation. In other implementations, training operations and querying operations can be interleaved.

The tool failure analysis component 160 can compare a signature associated with a candidate tool failure to a set of signatures stored in database(s) 170. The set of signatures stored in database(s) 170 can be associated with previously determined tool failures. A candidate tool failure related to fabrication tool(s) 110 can be considered a tool failure (e.g., a tool failure instance) in response to a determination that a signature associated with the candidate tool failure is similar to a signature stored in database(s) 170 (e.g., that a difference between a signature associated with the candidate tool failure and a signature stored in database(s) 170 is below a certain threshold value). Tool failure instances and/or information associated with tool failure instances can be stored in the database(s) 170. Database(s) 170 can store, for example, a set of signatures and/or a stored transformation for each tool failure instance. In an aspect, a set of signatures can be stored in a first database of the database(s) 170 and a set of transformation values can be stored in a second database of the database(s) 170. The tool failure analysis component 160 can further associate diagnostic tests and/or suggested repairs with observed tool failures. New tool failure instances can be employed by the tool failure analysis component 160 to determine similar past failures (e.g., to directing process engineers to a solution for fixing a tool failure). Furthermore, the tool failure analysis component 160 can be trained by specifying similarity or dissimilarity of the new failure with past failures based on a result of diagnosis or repair. Accordingly, the tool failure analysis component 160 can be employed to build a knowledge of actual failure occurrences associated with a fabrication operation (e.g., a manufacturing operation), a knowledge of a state of a tool as captured by a signature, and/or knowledge of an associated repair procedure necessary to validate and/or fix a tool failure.

The tool failure analysis component 160 can query the database(s) 170 to facilitate determining, predicting and/or preventing tool failures associated with fabrication tool(s) 110. The tool failure analysis component 160 can continuously query the database(s) 170 in real time in response to a determination that a signature is generated (e.g., to notify a user of situations where a tool failure is imminent). Similarity (e.g., distance) between a candidate tool failure (e.g., a new candidate tool failure associated with fabrication tool(s) 110) and tool failures stored in the database(s) 170 can be determined by the tool failure analysis component 160. In certain implementations, the tool failure analysis component 160 can transform a candidate tool failure and/or tool failures stored in the database(s) 170 before computing distance between a candidate tool failure and tool failures stored in the database(s) 170. In other implementations, the tool failure analysis component 160 can generate and/or output a ranked list of tool failures configured based on similarity to a particular tool failure.

In a non-liming example, when a first part-A fails, the tool failure analysis component 160 can record process data (e.g., a summary of tool data, relevant process data, etc.), label a tool failure associated with the first part-A (e.g., Part-A-Failure), and/or associate a repair procedure with the label for the tool failure to repair the tool failure (e.g., steps for repairing a tool failure, tests for validating a repaired tool failure, etc.). The tool failure analysis component 160 can additionally store the label, a signature and/or repair information associated with the tool failure associated with the first part-A. Furthermore, the tool failure analysis component 160 can output a list of failures that are similar to the last signature or a selected signature (e.g., a selected signature received by the tool failure analysis component 160 and/or selected from the database(s) 170). In response to a determination that a second instance of the first part-A fails, the tool failure analysis component 160 can record other process data (e.g., another summary of the tool data, etc.), label another tool failure associated with the first part-A, and associate a repair procedure with the label for the other tool failure (e.g., a repair procedure that corresponds to a repair procedure used to repair the first tool failure of the first part-A). The tool failure analysis component 160 can determine whether the tool failure associated with the first part-A and the other tool failure associated with the first part-A are similar (e.g., the tool failure analysis component 160 can distort n-dimension space so that the two instances of the tool failure associated with the first part-A are close together in the transformed n-dimensional space). In response to a determination that a second part-B fails for the first time, the tool failure analysis component 160 can determine a signature, a label, and repair procedure for the second part-B. The tool failure analysis component 160 can further determine whether a tool failure associated with the second part-B is similar to other tool failures and/or whether a tool failure associated with the second part-B is not similar other failures observed in a list of tool failures.

The tool failure analysis component 160 can generate output data (e.g., OUTPUT DATA shown in FIG. 1). The output data generated by the tool failure analysis component 160 can include, but is not limited to, tool failure analysis data, a candidate tool failure, a determined tool failure, a ranked list of tool failures, a repair procedure, and/or other output data associated with fabrication tool(s) 110 and/or database(s) 170. In an aspect, the output data generated by the tool failure analysis component 160 can be stored in the database(s) 170 and/or other database(s). In another aspect, the output data generated by the tool failure analysis component 160 can be displayed (e.g., rendered) on a user device, such as but not limited to, graphical user interface, a workstation device, a desktop computer, a laptop computer, a tablet computer, a smartphone, or another type of user device. The user device that receives the output data generated by the tool failure analysis component 160 can be associated with processor(s) that may interact with a keyboard, a mouse, a display monitor, a touchscreen, and/or other such interface devices. It is to be appreciated that a user device that receives the output data generated by the tool failure analysis component 160 can be configured to receive the output data and/or to render the output data to a user in any suitable format (e.g., visual, audio, tactile, etc.).

Figure 2:
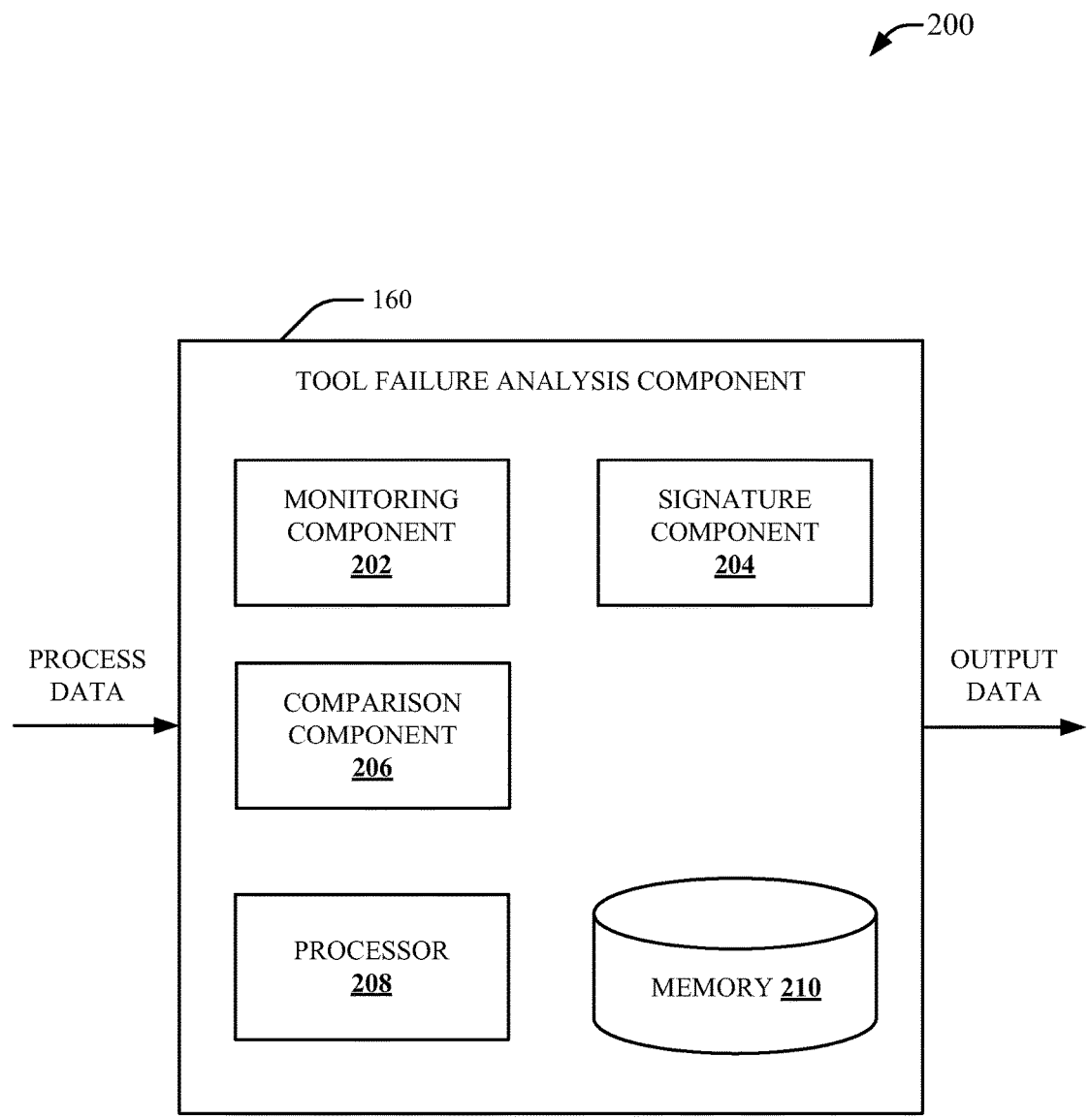
FIG. 2 is a block diagram illustrating an exemplary tool failure analysis component, in accordance with various aspects and implementations described herein.

FIG. 2 illustrates a non-limiting implementation of a system 200 in accordance with various aspects and implementations of this disclosure. System 200 includes tool failure analysis component 160. Tool failure analysis component 160 can include a monitoring component 202, a signature component 204 and/or a comparison component 206. Aspects of system 200 and/or other systems disclosed herein can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. In an embodiment, system 200 can include memory 210 for storing computer executable components and instructions. System 200 can further include a processor 208 to facilitate operation of the instructions (e.g., computer executable components and instructions) by system 200.

The monitoring component 202 can receive and/or monitor process data (e.g., PROCESS DATA shown in FIG. 2) associated with fabrication tool(s) 110. The process data can be obtained and/or generated by spectroscope 120, tool sensors 130, device measurement equipment 140 and/or classifying equipment 150. In an implementation, at least a portion of the process data can be associated with a tool process log. Based on at least a portion of the process data, the monitoring component 202 can determine (e.g., identify) a candidate tool failure associated with the fabrication tool(s) 110. For example, the monitoring component 202 can determine a candidate tool failure associated with the fabrication tool(s) 110 based on sensor data generated by a set of sensors associated with the fabrication tool(s) 110 (e.g., sensor data associated with the tool sensors 130). Additionally or alternatively, the monitoring component 202 can determine a candidate tool failure associated with the fabrication tool(s) 110 based on data associated with spectroscope 120, device measurement equipment 140 and/or classifying equipment 150. The monitoring component 202 can determine whether process data (e.g., observed values associated with process data) deviates from expected values (e.g., set point values, specification values, process requirements, expected behavior, etc.). In an aspect, the monitoring component 202 can employ statistical process control and/or another monitoring technique with respect to the process data.

The signature component 204 can generate a signature dataset (e.g., a signature) for the candidate tool failure based on data associated with the fabrication tool(s) 110 (e.g., data associated with spectroscope 120, tool sensors 130, device measurement equipment 140 and/or classifying equipment 150). The signature component 204 can generate the signature dataset in response to the candidate tool failure being determined (e.g., identified) by the monitoring component 202. Data employed by the signature component 204 to generate the signature dataset can include the sensor data generated by the set of sensors associated with the fabrication tool(s) 110 (e.g., the sensor data associated with the tool sensors 130). Additionally or alternatively, data employed by the signature component 204 to generate the signature dataset can include other data (e.g., another portion of the process data) associated with the fabrication tool(s) 110. For example, the signature component 204 can additionally or alternatively generate a signature dataset associated with a candidate tool failure based on data associated with spectroscope 120, device measurement equipment 140 and/or classifying equipment 150.

The signature dataset can be a data structure (e.g., an indexed data structure) that includes data (e.g., a set of data values) associated with fabrication tool(s) 110 (e.g., spectroscope 120, tool sensors 130, device measurement equipment 140 and/or classifying equipment 150). For example, the signature dataset can be an array of information (e.g., a container of data) associated with fabrication tool(s) 110 (e.g., spectroscope 120, tool sensors 130, device measurement equipment 140 and/or classifying equipment 150). The data associated with fabrication tool(s) 110 can be, in one example, a sequence of differences between expected values and observed values associated with spectroscope 120, tool sensors 130, device measurement equipment 140 and/or classifying equipment 150. Size of the signature dataset can be increased or decreased based on data associated with fabrication tool(s) 110 (e.g., spectroscope 120, tool sensors 130, device measurement equipment 140 and/or classifying equipment 150). In an implementation, the signature dataset can be a signature vector. For example, the signature dataset can be an n-dimensional vector that includes data (e.g., attribute values) associated with spectroscope 120, tool sensors 130, device measurement equipment 140 and/or classifying equipment 150.

The comparison component 206 can compare the candidate tool failure to at least one tool failure (e.g., at least one previously determined tool failure) based on the signature dataset and at least one other signature dataset associated with the at least one tool failure. For example, the comparison component 206 can compare the signature dataset (e.g., data values of the signature dataset) to the at least one other signature dataset (e.g., data values of the at least one other signature dataset) to facilitate determining whether the candidate tool failure is a tool failure. The at least one other signature dataset can be previously determined (e.g., by the signature component 204) based on the at least one tool failure and/or can be stored in at least one database (e.g., database(s) 170). For example, the database(s) 170 can include a set of signature datasets associated with a set of previously determined tool failures. The comparison component 206 can determine distance (e.g., similarity) between the candidate tool failure and the at least one determined tool failure based at least on the signature dataset and the at least one other signature dataset (e.g., based on distance between the signature dataset and the at least one other signature dataset). For example, the comparison component 206 can determine a difference between the signature dataset and the at least one other signature dataset to facilitate determining distance (e.g., similarity) between the candidate tool failure and the at least one determined tool failure.

In an aspect, the comparison component 206 can associate the candidate tool failure with a tool failure in response to a determination that difference between the signature dataset and the at least one other signature dataset is within a certain distance (e.g., that difference is below a certain threshold value, that the candidate tool failure is similar to the at least one tool failure, etc.). The comparison component 206 can label the candidate tool failure as a tool failure. The comparison component 206 can additionally store the signature dataset in at least one database (e.g., the database(s) 170) and/or associate the signature dataset with the at least one other signature dataset (e.g., add the candidate tool failure to a list of tool failures associated with the at least one other signature dataset). The comparison component 206 can also record and/or store at least a portion of the process data associated with the signature dataset (e.g., process data, a summary of tool data, etc.) in response to a determination that the candidate tool failure is similar to the at least one tool failure. Additionally or alternatively, the comparison component 206 can determine repair information (e.g., a repair plan, a repair procedure and/or tests for validating failure) to facilitate repairing a tool failure in response to a determination that the candidate tool failure is similar to the at least one tool failure. The comparison component 206 can associate a candidate tool failure with repair information (e.g., a repair plan, a repair procedure and/or tests for validating failure) associated with the fabrication tool(s) 110. In an embodiment, a label, a signature dataset and/or repair information can be stored in at least one database (e.g., the database(s) 170) for a tool failure.

While FIG. 2 depicts separate components in system 200, it is to be appreciated that the components may be implemented in a common component. In one example, the monitoring component 202, the signature component 204 and/or the comparison component 206 can be included in a single component. Further, it can be appreciated that the design of system 200 can include other component selections, component placements, etc., to facilitate determining, predicting and/or preventing tool failures.

Figure 3:
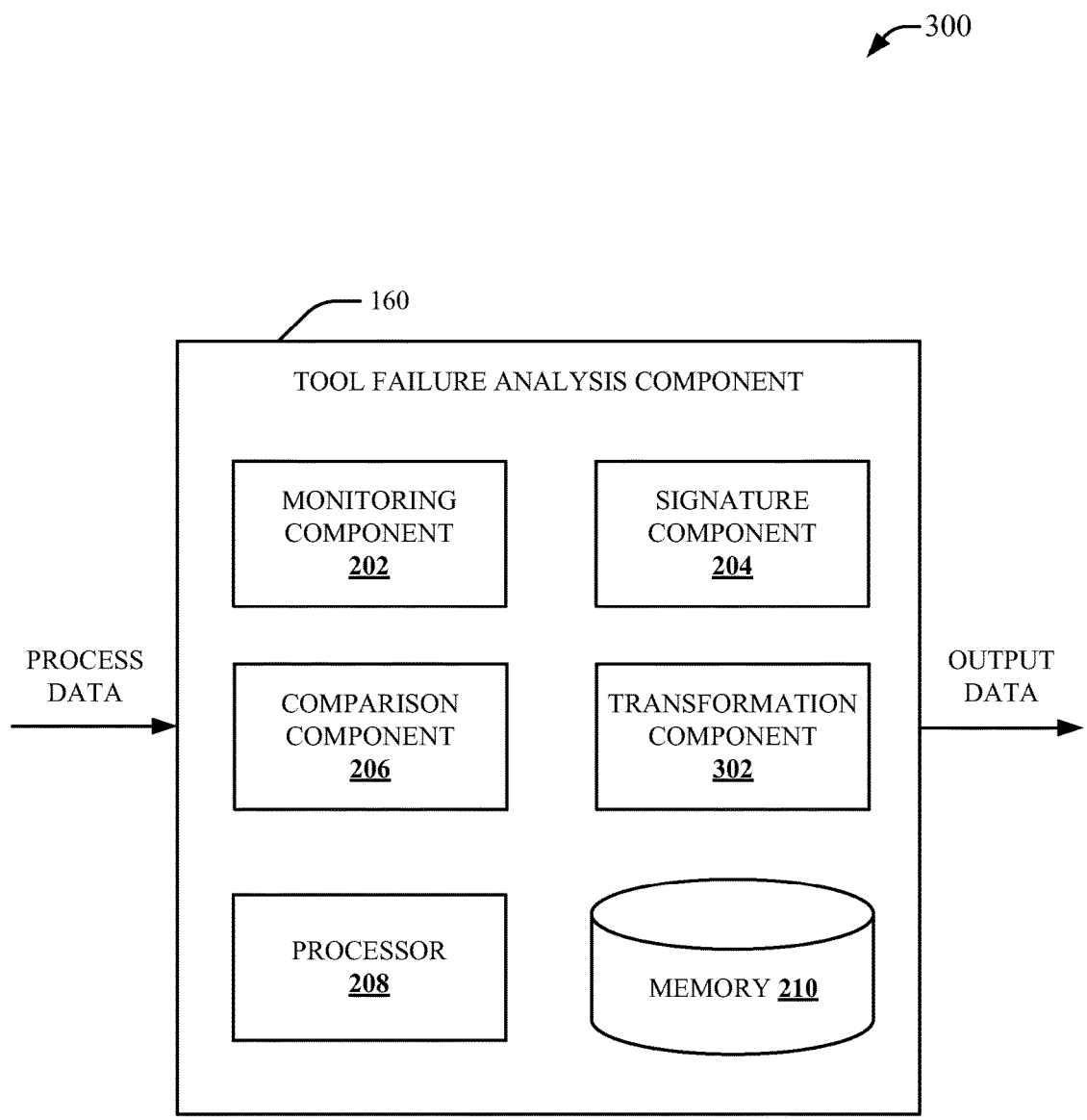
FIG. 3 is a block diagram illustrating another exemplary tool failure analysis component, in accordance with various aspects and implementations described herein.

FIG. 3 illustrates a non-limiting implementation of a system 300 in accordance with various aspects and implementations of this disclosure. System 300 includes tool failure analysis component 160. Tool failure analysis component 160 can include the monitoring component 202, the signature component 204, the comparison component 206 and/or a transformation component 302.

The transformation component 302 can generate a transformation value (e.g., a learned transformation value) based on the process data associated with spectroscope 120, tool sensors 130, device measurement equipment 140 and/or classifying equipment 150. A transformation value can additionally or alternatively be generated and/or modified via user input. A transformation value can be associated with a signature dataset (e.g., a candidate tool failure). The transformation value generated by the transformation component 302 can be employed to normalize a signature dataset and/or at least one other signature dataset generated by the signature component 204. For example, the transformation value generated by the transformation component 302 can be employed so that each component (e.g., each data value) of a signature dataset (e.g., a signature vector) and/or at least one other signature dataset (e.g., at least one other signature vector) comprise an equal weight. The transformation value generated by the transformation component 302 can normalize a signature dataset and/or at least one other signature dataset so that each component (e.g., each data value) of a signature dataset and/or at least one other signature dataset is between 0 and 1.

In an aspect, the transformation value generated by the transformation component 302 can be an initial transformation value associated with the signature dataset. For example, the initial transformation value can be an identity transformation (e.g., an identity transformation value) associated with a signature dataset. An identity transformation can be employed (e.g., using Euclidian distance as a similarity measure) so that tool failures are considered similar if difference between signature datasets is small (e.g., below a certain difference value). In another aspect, the transformation value generated by the transformation component 302 can be a modified transformation value (e.g., a learned transformation value) associated with a signature dataset. The initial transformation value can be modified (e.g., updated), for example, based on user input and/or previous comparisons associated with a signature dataset (e.g., compared via the comparison component 206) to generate a modified transformation value. A defined distance can be employed, in an embodiment, to modify (e.g., update) a transformation value (e.g., an initial transformation value, a modified transformation value, etc.). A transformation value can be updated, for example, based on a defined distance (e.g., a required distance between a first signature dataset and a second signature dataset). A defined distance can be associated with user input.

In certain implementations, the comparison component 206 can employ the transformation value to determine distance (e.g., similarity) between a candidate tool failure and at least one tool failure. For example, the comparison component 206 can determine distance (e.g., similarity) between a candidate tool failure and at least one previously determined tool failure based on a signature dataset, at least one other signature dataset and a transformation value. A transformation value can be applied, in one example, to a difference between a signature dataset and at least one other signature dataset to facilitate determining distance (e.g., similarity) between a candidate tool failure and at least one previously determined tool failure.

While FIG. 3 depicts separate components in system 300, it is to be appreciated that the components may be implemented in a common component. In one example, the monitoring component 202, the signature component 204, the comparison component 206 and/or the transformation component 302 can be included in a single component. Further, it can be appreciated that the design of system 300 can include other component selections, component placements, etc., to facilitate determining, predicting and/or preventing tool failures.

Figure 4:
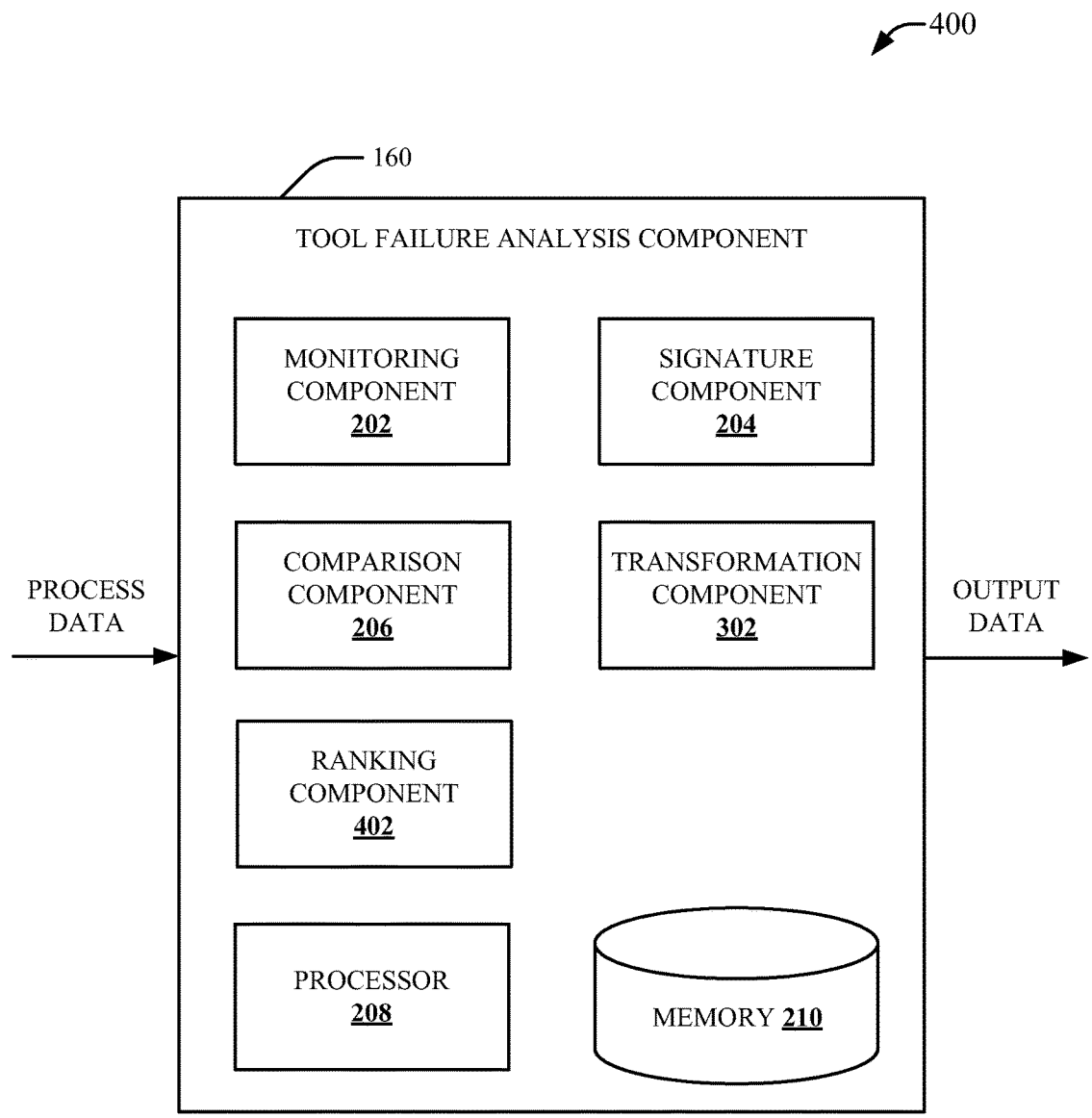
FIG. 4 is block diagram illustrating yet another exemplary tool failure analysis component, in accordance with various aspects and implementations described herein.

FIG. 4 illustrates a non-limiting implementation of a system 400 in accordance with various aspects and implementations of this disclosure. System 400 includes tool failure analysis component 160. Tool failure analysis component 160 can include the monitoring component 202, the signature component 204, the comparison component 206, the transformation component 302 and/or a ranking component 402.

The ranking component 402 can generate a ranked list of tool failures. For example, the ranking component 402 can generate a ranked list of tool failures based on distance (e.g., similarity) determined by the comparison component 206. Tool failures (e.g., signature datasets associated with tool failures) can be ranked according to a degree of similarity with respect to a candidate tool failure (e.g., a tool failure determined by the comparison component 206). A ranked list of tool failures generated by the ranking component 402 can show a most to least similar tool failure with respect to a candidate tool failure. The ranking component 402 can rank a candidate tool failure in a list of tool failures based on similarity between a signature dataset associated with the candidate tool failure and at least one other signature dataset associated with previously determined tool failures. In an aspect, the comparison component 206 and/or the ranking component 402 can add a candidate tool failure to a list of tool failures generated and/or maintained by the ranking component 402 (e.g., in response to a determination that the candidate tool failure is similar to at least one previously determined tool failure).

A ranked list of tool failures can be generated based on at least information associated with signature datasets stored in the database(s) 170. When a new tool failure is added to the database(s) 170, the ranking component 402 can generate and/or update the ranked list of tool failures based on a specific distance function employed to compare signature datasets and/or by user input. A random distance measure (e.g., an arbitrary distance measure with n-dimensional Euclidean distance) can be employed by the ranking component 402. A random distance measure can be selected via user input and/or can be employed as a default distance measure. The ranking component 402 can further employ user input to allow training with respect to a ranked list of tool failures (e.g., to improve quality of a ranking related to a particular tool failure). User input can identify two tool failures as being more similar or less similar. Furthermore, user input can specify similarity in terms of a normalized scale (e.g., a value of 0 corresponding to completely dissimilar and a value of 1 corresponding to completely similar, etc.)

The ranking component 402 can output the ranked list of tool failures for display (e.g., display on a user device). The ranking component 402 can provide a constantly updated list of ranked tool failures (e.g., a real-time ranked list of tool failures) corresponding to a candidate tool failure determined and/or identified by the monitoring component 202. Accordingly, impact of tool failures in a system (e.g., system 100) can be limited and/or reduced (e.g., recognition of tool failures in a fabrication system can be improved). Moreover, a real-time ranked list of tool failures can be employed to identify commonly occurring signatures prior to an imminent tool failure. In an aspect, commonly occurring signatures (e.g., a pre-failure signature, an early-warning signature, etc.) can be stored and/or retrieved in connection with the tool failure analysis component 160 and/or the database(s) 170.

While FIG. 4 depicts separate components in system 400, it is to be appreciated that the components may be implemented in a common component. In one example, the monitoring component 202, the signature component 204, the comparison component 206, the transformation component 302 and/or the ranking component 402 can be included in a single component. Further, it can be appreciated that the design of system 400 can include other component selections, component placements, etc., to facilitate determining, predicting and/or preventing tool failures.

Figure 5:
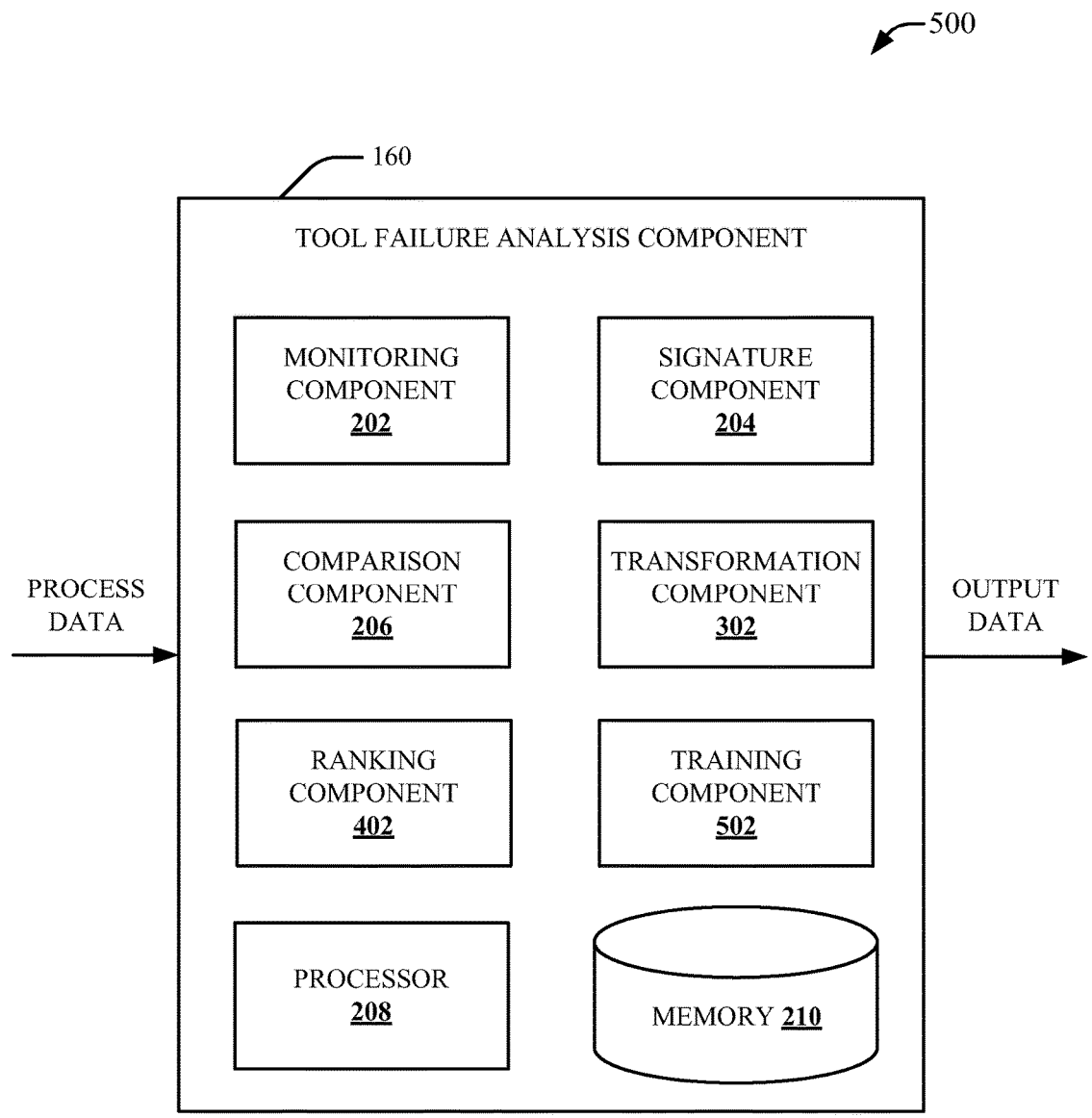
FIG. 5 illustrates yet another exemplary tool failure analysis component, in accordance with various aspects and implementations described herein.

FIG. 5 illustrates a non-limiting implementation of a system 500 in accordance with various aspects and implementations of this disclosure. System 500 includes tool failure analysis component 160. Tool failure analysis component 160 can include the monitoring component 202, the signature component 204, the comparison component 206, the transformation component 302, the ranking component 402 and/or a training component 502.

The training component 502 can generate and/or update a signature dataset, a transformation value and/or other information associated with a signature dataset based on user input. The training component 502 can employ user input to modify (e.g., correct) similarity computed by the comparison component 206. For example, user input can specify that a first signature dataset and a second signature dataset determined to be similar by the comparison component 206 are dissimilar. User input can also specify that a first signature dataset and a second signature dataset determined to be dissimilar by the comparison component 206 are similar. A transformation value can be modified based on user input employed to correct similarity computed by the comparison component 206. User input employed by the training component 502 can include information associated with a pair of tool failures and/or signature datasets associated with the pair of tool failures. User input employed by the training component 502 can additionally include information associated with similarity (e.g., relative similarity prediction) between the pair of tool failures. For example, user input can include a defined distance that can be a required distance between a first signature and a second signature so that the first signature and the second signature are considered similar. Accordingly, the training component 502 can receive feedback (e.g., user input and/or information associated with the fabrication tool(s) 110) associated with similarity and/or dissimilarity of failures (e.g., tool failures). Moreover, the training component 502 can distort an n-dimensional space associated with a transformation (e.g., modify a transformation value, modify a transformation matrix, etc.) so that similar signature datasets (e.g., similar failure signatures) approach each other in n-dimensional space and dissimilar signature datasets (e.g., dissimilar failure signatures) move away from each other in n-dimensional space. Information associated with similarity between the pair of tool failures can alternatively be determined based on criteria associated with the fabrication tool(s) 110 (e.g., a state of output for the fabrication tool(s) 110 when tool failure(s) occur).

While FIG. 5 depicts separate components in system 500, it is to be appreciated that the components may be implemented in a common component. In one example, the monitoring component 202, the signature component 204, the comparison component 206, the transformation component 302, the ranking component 402 and/or the training component 502 can be included in a single component. Further, it can be appreciated that the design of system 500 can include other component selections, component placements, etc., to facilitate determining, predicting and/or preventing tool failures.

Figure 6:
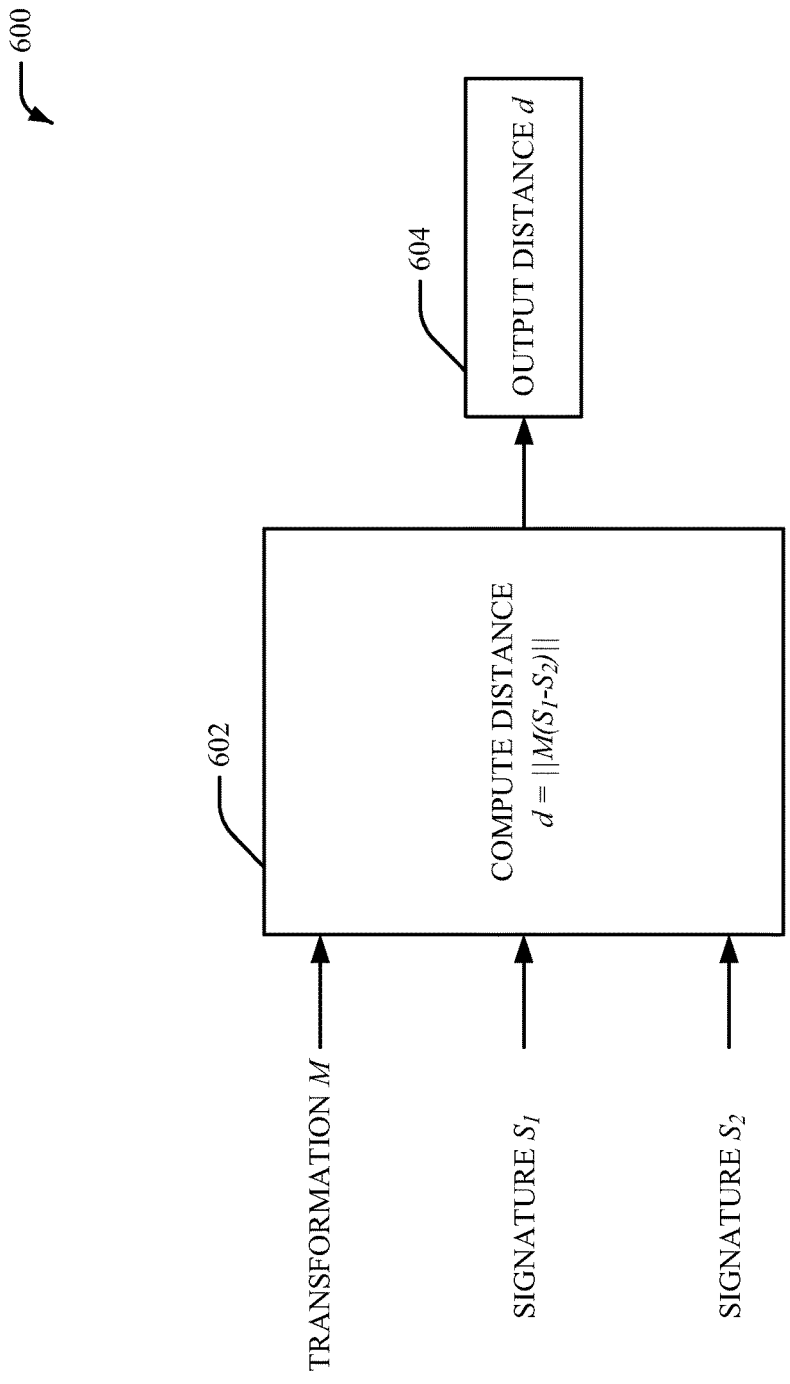
FIG. 6 illustrates an exemplary system for determining distance (e.g., similarity) between two signatures, in accordance with various aspects and implementations described herein.

FIG. 6 is block diagram illustrating an exemplary system 600 for determining distance (e.g., similarity) between two signatures using a transformation (e.g., a transformation value, a learned transformation) in accordance with various aspects and implementations of this disclosure. System 600 can be associated with the comparison component 206 and/or the transformation component 302. A transformation M, a signature $S_1$ and a signature $S_2$ can be received by block 602. Transformation M can be an initial transformation value (e.g., an identity transformation value) or an updated transformation value (e.g., a learned transformation value, a modified transformation value, etc.). Signature $S_1$ can be associated with observed values for process data (e.g., process data associated with spectroscope 120, tool sensors 130, device measurement equipment 140 and/or classifying equipment 150). Signature $S_2$ can be associated with a previously determined process data (e.g., process data associated with a previously determined tool failure). In one example, the signature $S_1$ can be a signature vector of a first artifact (e.g., a candidate tool failure) and the signature $S_2$ can be a signature vector of a second artifact (e.g., a tool failure, a previously determined tool failure, etc.). Block 602 can be associated with tool failure analysis component 160 (e.g., comparison component 206). At block 602, a distance d can be computed based on the transformation M, the signature $S_1$ and the signature $S_2$. For example, distance d can be equal to $\|M(S_1-S_2)\|$. Block 604 can also be associated with tool failure analysis component 160 (e.g., comparison component 206). At block 604, the distance d can be output (e.g., transmitted and/or stored). In one example, the distance d can be stored in and/or can be employed to generate a list of similar artifacts (e.g., a list of similar tool failures).

Figure 7:
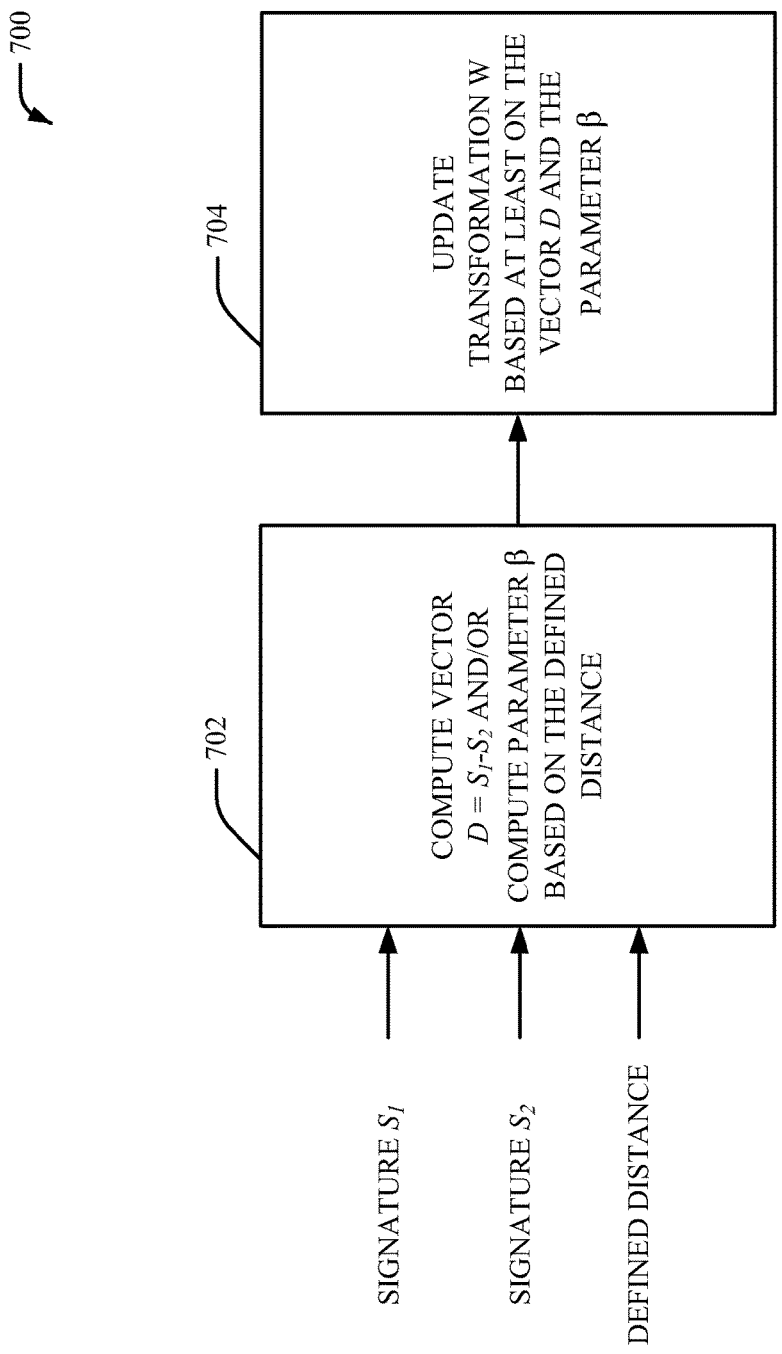
FIG. 7 illustrates an exemplary system for updating a transformation based on a defined distance, in accordance with various aspects and implementations described herein.

FIG. 7 is block diagram illustrating an exemplary system 700 for updating a transformation (e.g. a learned transformation W) based on a defined distance (e.g., required distance) in accordance with various aspects and implementations of this disclosure. System 700 can be associated with the comparison component 206 and/or the training component 502. The signature $S_1$, the signature $S_2$ and/or a defined distance can be received by block 702. The defined distance can be a required distance between the signature $S_1$ and the signature $S_2$ so that the signature $S_1$ and the signature $S_2$ are considered similar. In one example, the defined distance can be provided via user input. Block 702 can be associated with tool failure analysis component 160 (e.g., comparison component 206). At block 702, a vector D and/or a parameter β can be computed. Vector D can be equal to $S_1-S_2$. Parameter β can be computed based on the defined distance. Block 704 can also be associated with tool failure analysis component 160 (e.g., comparison component 206). At block 704, a transformation W can be updated based at least on the vector D and parameter β. In one example, the transformation W can be updated to be equal to $W(-\beta(1/D^TD)DD^T+1)$, where $D^TD$ is a normalized outer product of D and $DD^T$ is a transpose of D. Distance (e.g., similarity) between the signature $S_1$ and the signature $S_2$ can be a length $\|WD\|$ of the vector $D=S_1-S_2$. A projection operator P of the signature space associated with the vector D can be defined as the normalized outer product of D and the transpose of D, e.g., $P=(1/D^TD)DD^T$. The transformation W can be updated to a new transformation $W=W(\beta P+1)$ to facilitate learning a new distance (e.g., similarity) between the signature $S_1$ and the signature $S_2$. The parameter β can control the change (e.g., a degree of change) of distance. In an example where β=−1, the distance between the signature $S_1$ and the signature $S_2$ with respect to the new transformation W' will be 0 because W'D=W(−1P+1)D=W(−D+D)=0. In another example where β=1, the distance between the signature $S_1$ and the signature $S_2$ with respect to the new transformation W' will double because W'D=W(1P+1)D=W(D+D)=2WD and $\|2WD\|=2\|WD\|$. Therefore, distance can be modified (e.g., increased or decreased) based on the parameter β. In certain embodiments, the new transformation W' can be normalized before being stored (e.g., before being stored in the data base(s) 170).

Figure 8:
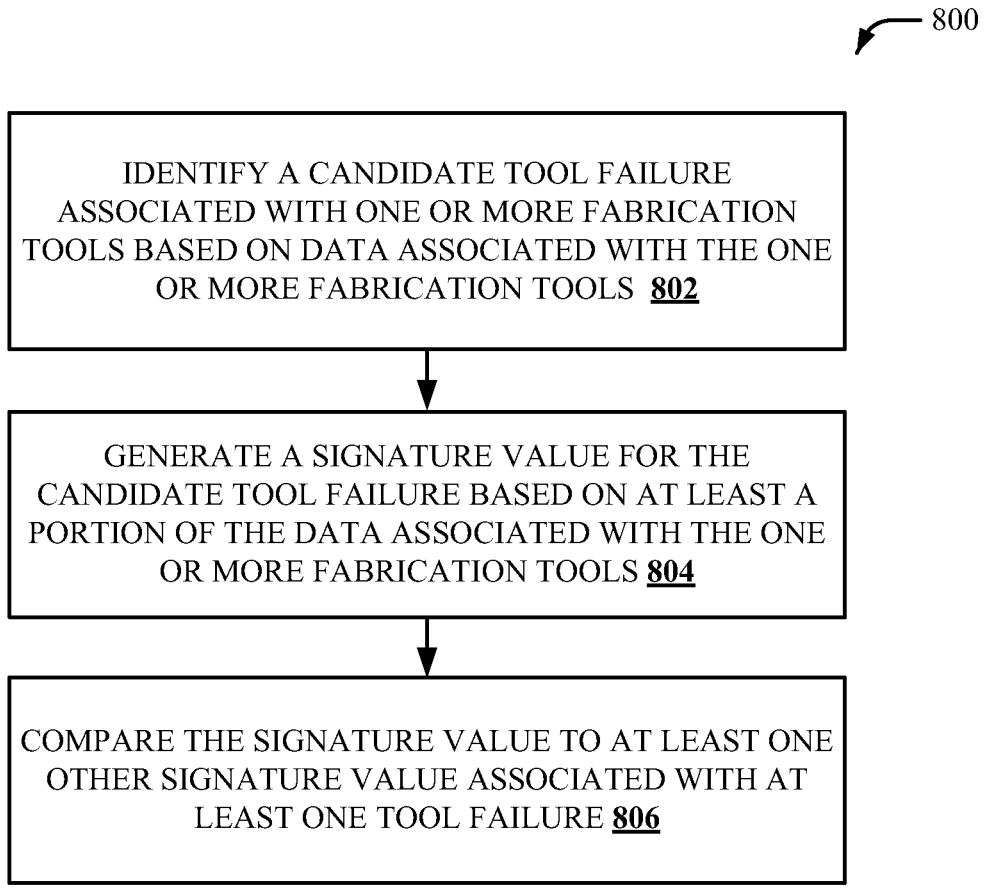
FIG. 8 is a flowchart of an example methodology to facilitate determining a tool failure, in accordance with various aspects and implementations described herein.
Figure 9:
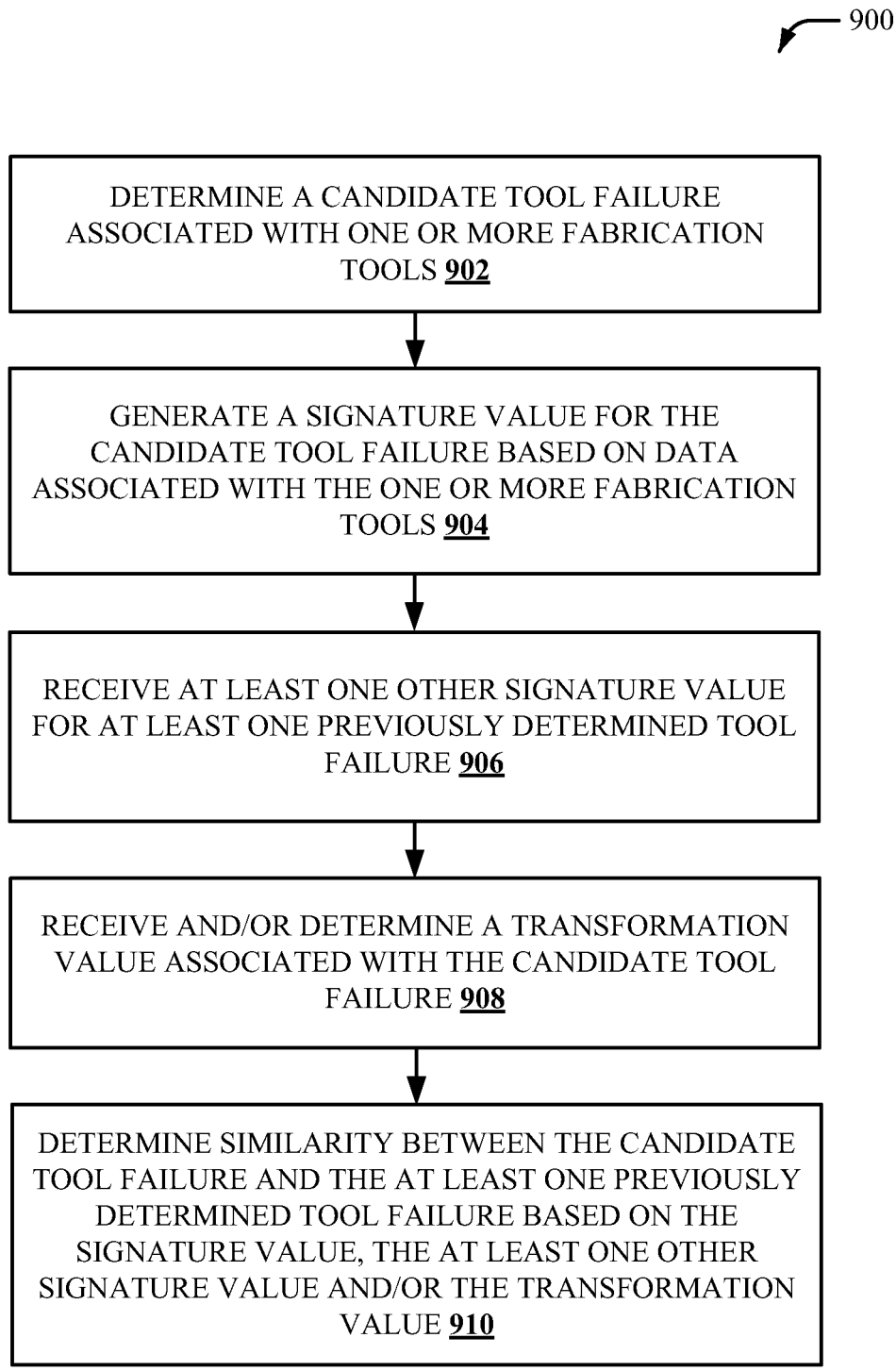
FIG. 9 is a flowchart of an example methodology for recognizing a tool failure, in accordance with various aspects and implementations described herein.
Figure 10:
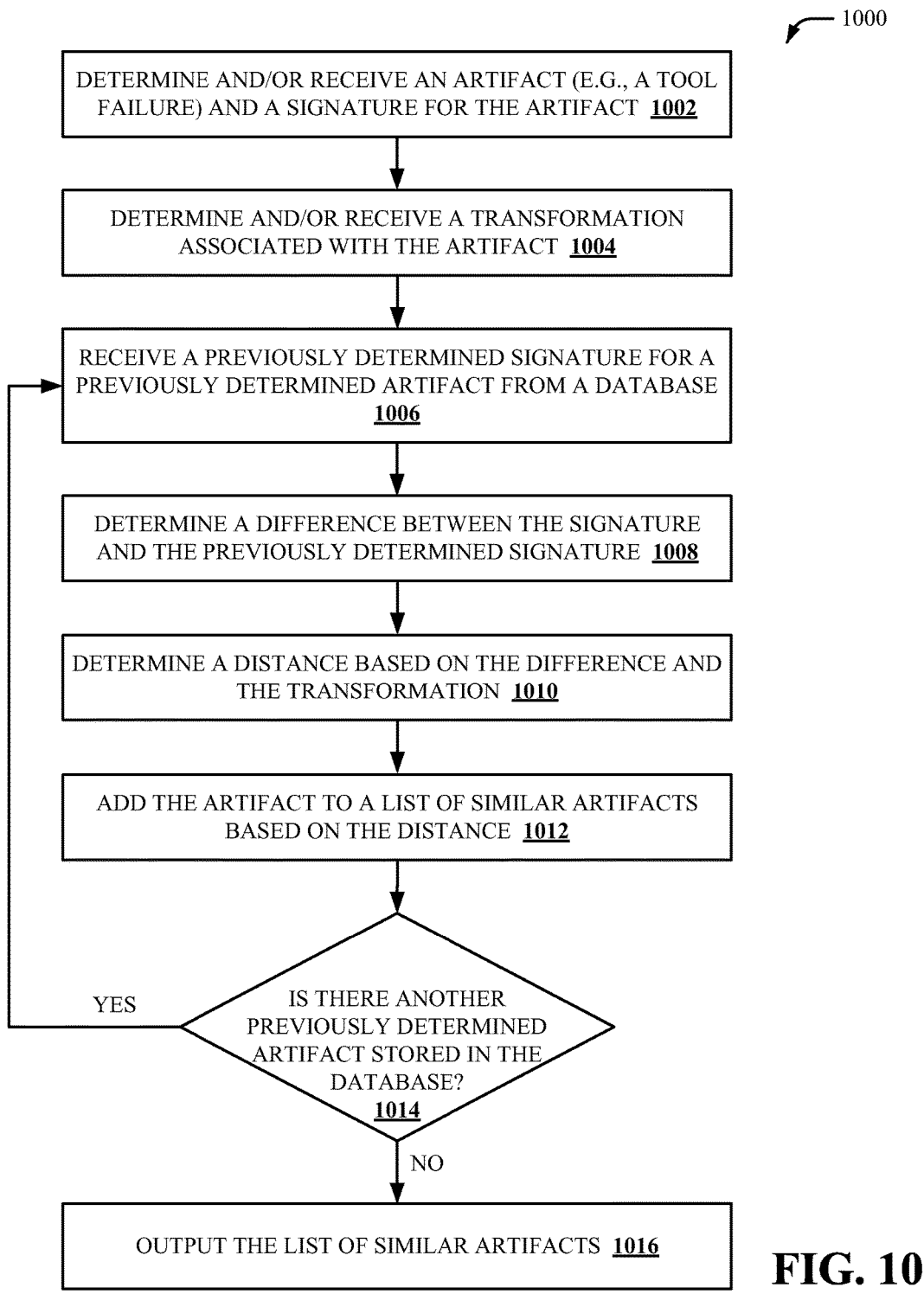
FIG. 10 is a flowchart of an example methodology for querying a database for artifacts similar to a given artifact, in accordance with various aspects and implementations described herein.

FIGS. 8-10 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 to facilitate determining a tool failure in accordance with various aspects and implementations of this disclosure. Initially, at 802, a candidate tool failure associated with one or more fabrication tools is identified (e.g., by a monitoring component 202) based on data associated with the one or more fabrication tools. For example, a candidate tool failure associated with one or more fabrication tools can be identified based on sensor data generated by a set of sensors associated with the one or more fabrication tools. Additionally or alternatively, a candidate tool failure associated with one or more fabrication tools can be identified based spectroscope data, measurement data, classifying data and/or other process data associated with the one or more fabrication tools. A candidate tool failure can be associated with an unplanned interruption related to the one or more fabrication tools, a deviation from set points and/or specifications associated with the one or more fabrication tools (e.g., variance of sensor data, spectroscope data, measurement data, classifying data and/or other process data), a hard tool failure, a soft tool failure, a calibration error, tool wear, tool breakdown, tool malfunction, tool downtime, another tool failure, etc.

At 804, a signature dataset for the candidate tool failure is generated (e.g., by a signature component 204) based on at least a portion of the data associated with the one or more fabrication tools. For example, a signature dataset for the candidate tool failure can be generated based on the sensor data, spectroscope data, measurement data, classifying data and/or other process data associated with the one or more fabrication tools. The signature dataset can be a data structure (e.g., an indexed data structure, a signature vector, etc.) that includes at least a portion of the data associated with the one or more fabrication tools.

At 806, the signature dataset is compared to at least one other signature dataset associated with at least one tool failure (e.g., using a comparison component 206). For example, similarity (e.g., a difference, distance, etc.) between the signature dataset at the at least one other dataset can be determined (e.g., to facilitate determining whether the signature dataset is associated with a tool failure). The at least one other signature dataset can be stored in one or more databases. The at least one tool failure associated with the at least one other signature dataset can be at least one previously determined tool failure.

FIG. 9 illustrates an example methodology 900 for recognizing a tool failure in accordance with various aspects and implementations of this disclosure. Initially, at 902, a candidate tool failure associated with one or more fabrication tools is determined (e.g., by a monitoring component 202). At 904, a signature dataset for the candidate tool failure is generated (e.g., by a signature component 204) based on data associated with the one or more fabrication tools. At 906, at least one other signature dataset for at least one previously determined tool failure is received (e.g., by a signature component 204 and/or a comparison component 206). At 908, a transformation value associated with the candidate tool failure is received and/or determined (e.g., by a transformation component 302). For example, the transformation value can be employed to normalize the signature dataset and/or the at least one other signature dataset. Accordingly, each value of the signature dataset and/or the at least one other signature dataset can comprise an equal weight. At 910, similarity between the candidate tool failure and the at least one previously determined tool failure is determined (e.g., by a comparison component 206) based on the signature dataset, the at least one other signature dataset and/or the transformation value. For example, a difference between the signature dataset and the at least one other signature dataset that is normalized by the transformation value can correspond to similarity between the candidate tool failure and the at least one previously determined tool failure.

FIG. 10 illustrates an example methodology 1000 for querying a database for artifacts similar to a given artifact in accordance with various aspects and implementations of this disclosure. Initially, at 1002, an artifact (e.g., a tool failure) and a signature for the artifact is determined and/or received (e.g., by a monitoring component 202). At 1004, a transformation associated with the artifact is determined and/or received (e.g., by a transformation component 302). At 1006, a previously determined signature for a previously determined artifact is received (e.g., by a signature component 204 and/or a comparison component 206) from a database. At 1008, a difference between the signature and the previously determined signature is determined (e.g., by a comparison component 206). At 1010, a distance is determined (e.g., by a comparison component 206) based on the difference and the transformation. At 1012, the artifact is added to a list of similar artifacts (e.g., by a ranking component 402) based on the distance. At 1014, it is determined (e.g., by a signature component 204 and/or a comparison component 206) whether there is another previously determined artifact stored in the database. If yes methodology 1000 returns to 1006. If no, methodology 1000 proceeds to 1016. At 1016, the list of similar artifacts is outputted (e.g., by a ranking component 402).

Figure 11:
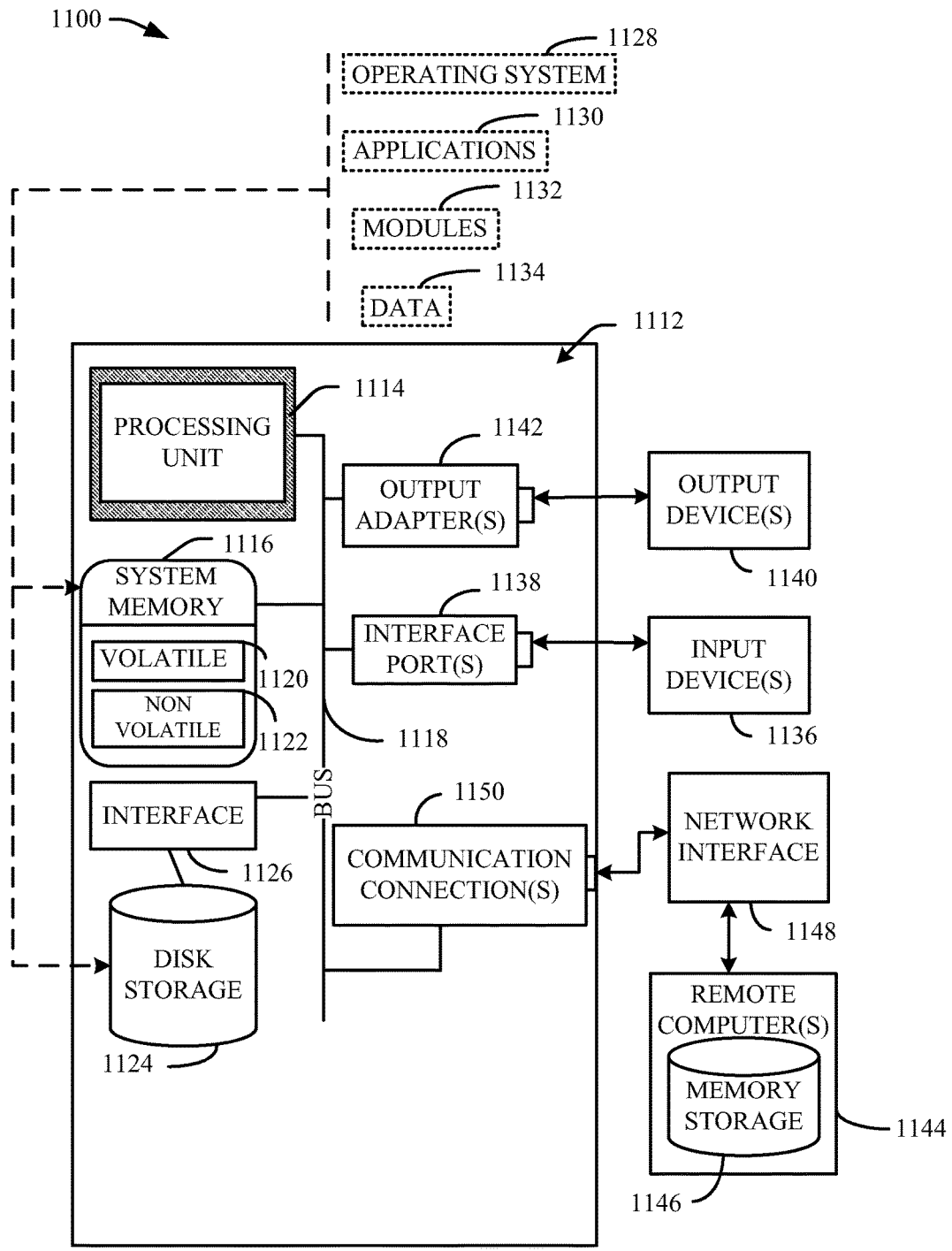
FIG. 11 is a schematic block diagram illustrating a suitable operating environment.
Figure 12:
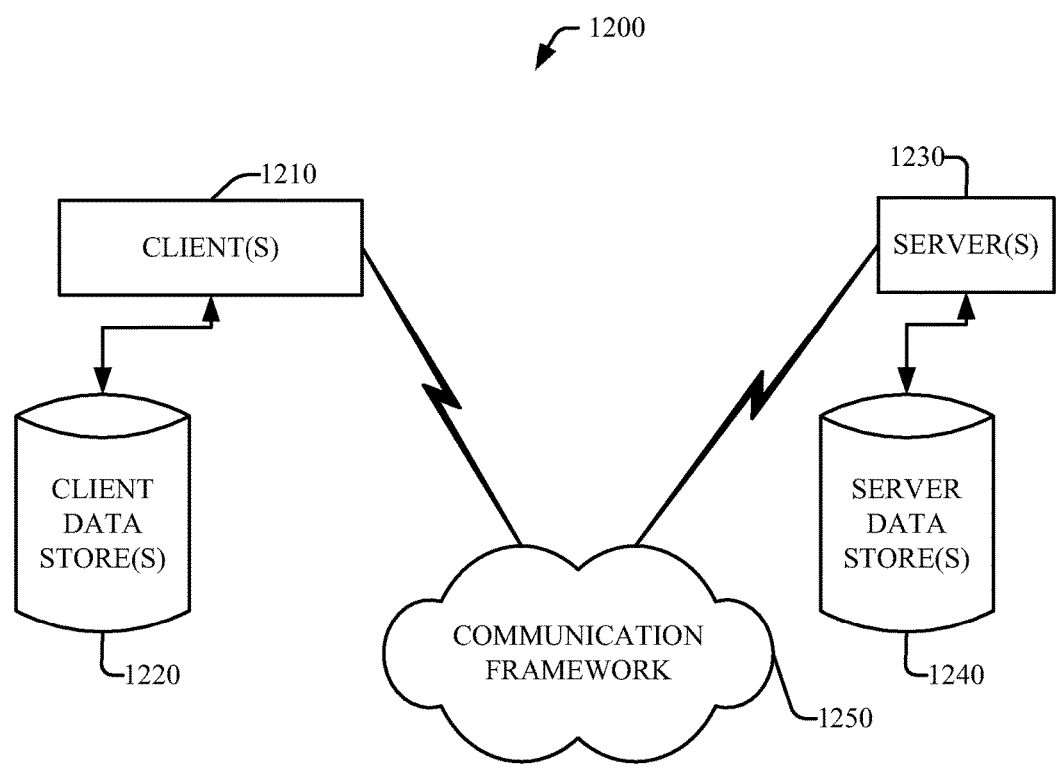
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory storing computer executable components; and
    a processor configured to execute the following computer executable components stored in the memory:
        a monitoring component that determines a candidate tool failure associated with one or more fabrication tools based on sensor data generated by a set of sensors associated with the one or more fabrication tools;
        a signature component that generates a signature dataset that includes statistical data indicative of statistical information for the candidate tool failure based on data associated with the one or more fabrication tools; and
        a comparison component that compares, based on the signature dataset for the candidate tool failure and at least one other signature dataset associated with at least one previously determined tool failure, the candidate tool failure to the at least one previously determined tool failure to determine whether the one or more fabrication tools are associated with a tool failure, wherein the comparison component generates repair data for the one or more fabrication tools to facilitate repair of the tool failure in response to a determination that the candidate tool failure satisfies a defined criterion.

2. The system of claim 1, further comprising a transformation component that generates a transformation value associated with the candidate tool failure based on process data for the candidate tool failure.

3. The system of claim 2, wherein the comparison component further compares the candidate tool failure to the at least one previously determined tool failure based on the transformation value.

4. The system of claim 2, wherein the comparison component determines a difference between the signature dataset and the at least one other signature dataset.

5. The system of claim 4, wherein the comparison component determines similarity between the signature dataset and the at least one other signature dataset based on the transformation value and the difference between the signature dataset and at least one other signature dataset.

6. The system of claim 1, wherein the comparison component associates the candidate tool failure with the tool failure in response to a determination that the candidate tool failure is similar to the at least one previously determined tool failure.

7. The system of claim 1, wherein the comparison component receives the at least one other signature dataset from a database that stores a set of signature datasets associated with a set of previously determined tool failures.

8. The system of claim 1, wherein the comparison component adds the candidate tool failure to a list of tool failures in response to a determination that the candidate tool failure is similar to the at least one previously determined tool failure.

9. The system of claim 8, further comprising a ranking component that ranks the candidate tool failure in the list of tool failures based on similarity between the signature dataset and the at least one other signature dataset.

10. The system of claim 1, wherein the comparison component associates the candidate tool failure with a repair plan associated with the repair data in response to the determination that the candidate tool failure satisfies the defined criterion.

11. The system of claim 1, wherein the signature component generates the signature dataset for the candidate tool failure based on the sensor data.

12. The system of claim 8, further comprising a training component that updates the signature dataset based on user input.

13. The system of claim 12, wherein the training component updates the signature dataset based on feedback associated with similarity and dissimilarity of tool failures.

14. The system of claim 12, wherein the training component updates a transformation value associated with the candidate tool failure to correct a similarity between the signature dataset and the at least one other signature dataset that is determined by the comparison component.

15. A method, comprising:
  employing a processor that facilitates execution of computer executable instructions stored on a non-transitory computer readable medium to implement operations, comprising:
    identifying a candidate tool failure associated with one or more manufacturing tools based on sensor data generated by a set of sensors associated with the one or more manufacturing tools;
    generating a signature dataset that includes statistical data indicative of statistics for the candidate tool failure based on the sensor data and other data associated with the one or more manufacturing tools;
    comparing the signature dataset to at least one other signature dataset associated with at least one tool failure for predicting whether the one or more manufacturing tools are associated with a tool failure; and
    generating repair data for the one or more manufacturing tools to facilitate repair of the tool failure in response to determining that the predicting satisfies a defined criterion.

16. The method of claim 15, further comprising generating a transformation value associated with the candidate tool failure based on process data for the candidate tool failure.

17. The method of claim 16, further comprising comparing the candidate tool failure to the at least one tool failure based on the signature dataset, the at least one other signature dataset, and the transformation value.

18. The method of claim 16, further comprising determining a difference between the signature dataset and the at least one other signature dataset.

19. The method of claim 18, further comprising determining similarity between the signature dataset and the at least one other signature dataset based on the transformation value and the difference between the signature dataset and at least one other signature dataset.

20. A computer-readable medium having stored thereon computer-executable instructions that, in response to execution by a system including a processor, cause the system to perform operations, the operations including:
  determining a candidate tool failure associated with one or more fabrication tools;
  generating a signature dataset that includes statistical data indicative of statistics for the candidate tool failure based on data associated with the one or more fabrication tools;
  comparing the signature dataset to at least one other signature dataset associated with at least one previously determined tool failure to facilitate detection of a tool failure associated with the one or more fabrication tools; and
  generating repair data for the one or more fabrication tools to facilitate repair of the tool failure in response to determining that the signature dataset satisfies a defined criterion.

21. The computer-readable medium claim 20, wherein the operations further include generating a transformation value associated with the candidate tool failure based on process data for the candidate tool failure.

22. The computer-readable medium claim 20, wherein the comparing includes comparing the candidate tool failure to the at least one previously determined tool failure based on the signature dataset, the at least one other signature dataset, and the transformation value.

* * * * *